US011311802B2

(12) United States Patent
Falc et al.

(10) Patent No.: US 11,311,802 B2
(45) Date of Patent: *Apr. 26, 2022

(54) METHOD FOR CONTROLLING A DISPLAY ELEMENT BY A GAMES CONSOLE

(71) Applicant: Nacon SAS, Fretin (FR)

(72) Inventors: Alain Falc, Kortrijk (BE); Yannick Allaert, Meurchin (FR); Alexandre Notebaert, Tourcoing (FR); Stephen Dudoyer, Lesquin (FR)

(73) Assignee: Nacon SAS, Fretin (FR)

( * ) Notice: Subject to any disclaimer, the term of this patent is extended or adjusted under 35 U.S.C. 154(b) by 431 days.

This patent is subject to a terminal disclaimer.

(21) Appl. No.: 16/326,496

(22) PCT Filed: Aug. 17, 2017

(86) PCT No.: PCT/EP2017/070812
§ 371 (c)(1),
(2) Date: Feb. 19, 2019

(87) PCT Pub. No.: WO2018/033590
PCT Pub. Date: Feb. 22, 2018

(65) Prior Publication Data

US 2021/0220734 A1 Jul. 22, 2021

(30) Foreign Application Priority Data

Aug. 19, 2016 (EP) .................................. 16185052

(51) Int. Cl.
*A63F 13/42* (2014.01)
*A63F 13/22* (2014.01)
(Continued)

(52) U.S. Cl.
CPC .............. *A63F 13/42* (2014.09); *A63F 13/22* (2014.09); *G06F 3/0338* (2013.01); *A63F 13/5255* (2014.09)

(58) Field of Classification Search
CPC .......... A63F 13/42; A63F 13/22; A63F 13/06; A63F 13/426; G06F 3/0338
See application file for complete search history.

(56) References Cited

U.S. PATENT DOCUMENTS 6,120,374 A * 9/2000 Akada ..................... G06F 3/038
463/3
6,396,473 B1 5/2002 Callahan et al.
(Continued)

FOREIGN PATENT DOCUMENTS

EP 0245776 A1 11/1987
EP 0823271 2/1998
(Continued)

OTHER PUBLICATIONS

European Search Report for EP16185052.4 dated Nov. 24, 2016. English translation not available.
(Continued)

*Primary Examiner* — Yingchuan Zhang
(74) *Attorney, Agent, or Firm* — Patterson Thuente Pedersen, P.A.

(57) ABSTRACT

A method for controlling a position of a display element, comprising the steps: —measuring a position of a control lever, —projecting the position of the lever into a base plane, in order to determine a first set of coordinates, —determining a circle of positions, —determining a square circumscribing the circle of positions, —projecting, onto the circumscribed square, at least one coordinate of the first set of coordinates, —calculating a second set of coordinates in a Cartesian frame of reference, on the basis of the projection of the at least one coordinate of the first set of coordinates onto the circumscribed square.

13 Claims, 2 Drawing Sheets

(51) Int. Cl.
G06F 3/0338 (2013.01)
A63F 13/5255 (2014.01)

(56) References Cited

U.S. PATENT DOCUMENTS

| | | | |
|---|---|---|---|
| 8,913,039 | B2 | 12/2014 | Nikolovski et al. |
| 9,033,805 | B2 | 5/2015 | Somarajapuram |
| 9,110,557 | B2 * | 8/2015 | Tresser .................. G06F 3/011 |
| 2010/0009735 | A1 | 1/2010 | Seydoux |
| 2010/0062817 | A1 | 3/2010 | Seydoux |
| 2013/0100021 | A1 | 4/2013 | Larsen et al. |
| 2014/0228115 | A1 | 8/2014 | Kaplan |
| 2014/0295942 | A1 | 10/2014 | Kendall |
| 2020/0261800 | A1 | 8/2020 | Falc et al. |

FOREIGN PATENT DOCUMENTS

| | | |
|---|---|---|
| EP | 245776 | 5/2012 |
| EP | 2524721 A2 | 11/2012 |
| FR | 3031404 A1 | 7/2016 |
| JP | 2013176457 A | 9/2013 |
| WO | WO-2014106594 A1 | 7/2014 |

OTHER PUBLICATIONS

International Search Report and Written Opinion for PCT/EP2017/070812 dated Oct. 23, 2017. English translation not available.
Application and File history for U.S. Appl. No. 16/639,684, filed Feb. 17, 2020. Inventors: Falc et al.
International Search Report and Written Opinion for Application No. PCT/EP2018/071781, dated Oct. 25, 2018, 13 pages.

* cited by examiner

METHOD FOR CONTROLLING A DISPLAY ELEMENT BY A GAMES CONSOLE

RELATED APPLICATIONS

The present application is a National Phase entry of PCT Application No. PCT/EP2017/070812, filed Aug. 17, 2017, which claims priority to EP16185052.4, filed Aug. 19, 2016, the contents of each being incorporated herein by reference in their entireties.

TECHNICAL FIELD

The present invention relates in general to a control method of a display element generated on a display screen by a video games console coupled to a games controller. In particular, embodiments of the invention relates to control of the display element when the games controller comprises a lever or a joystick moved by a user to control the position and/or travel of the display element which can be a sighting cursor or a scene viewed by an avatar of the user, from a position in the game or a control station, for example.

BACKGROUND ART

It is known in the prior art to use as much a system of coordinates according to a Cartesian frame of reference or a polar system to manage measuring the position of the lever, as disclosed by document EP2450776A1. Yet, it is often still necessary to send the games console coordinates according to a system of Cartesian coordinates, due to the standardized format for the games console.

It is common practice to project the measured positions in a base plane (which can for example be perpendicular to the lever when the latter is in the rest position, vertical for example). In the event where the lever can evolve in a travel zone limited by a mechanical stop (such as a circle, a hexagon or other polygon, any shape or even an ellipse), it is common to send to the console a full-scale signal when the lever is stopped and according to one of the diagonals of the base plane, and not to increase this signal when the lever moves into the quarter circle zones beyond the edges of a square inscribed in a projection of the mechanical stop, and having its apices on the above diagonals.

The predetermined travel zone of the lever is defined as being a zone of the space in which the lever can move before stopping with the casing of the games controller, for example. As is known, this stop can be a circle or a polygon, such as an octagon or a hexagon or even an ellipse, for example.

As a consequence, this management mode results in limitation of the travel zone (which has a form projected in the form of a circle, hexagon or other polygon, any shape or even an ellipse) to an effective measuring zone (which is the square inscribed in the projected circle).

SUMMARY

An aim of embodiments the present invention is to respond to the disadvantages of the document of the prior art mentioned hereinabove and in particular to first propose a control method of a position and/or travel of a display element generated on a display screen by a video games console coupled to a games controller comprising a control lever arranged to be shifted by a user according to at least two degrees of freedom in a predetermined zone, which exploits the entire travel zone of the control lever, while sending Cartesian coordinates to the games console.

For this, a first aspect of embodiments the invention relates to a control method of a position and/or travel of a display element generated on a display screen by a video games console coupled to a games controller comprising a control lever arranged to be shifted by a user according to at least two degrees of freedom in a predetermined zone, the process comprising the steps of:
measuring a position of the control lever in the predetermined zone with at least one sensor outputting at least one electric signal per degree of freedom,
projecting in a base plane the position of the control lever measured with the at least one sensor, to determine a first set of coordinates,
determining a circle of positions, centered on a rest position of the control lever and passing through the projected position of the control lever in the base plane,
determining a circumscribed square on the circle of positions,
projecting onto the circumscribed square at least one coordinate of the first set of coordinates,
calculating a second set of coordinates in a Cartesian frame of reference, on the basis of the projection of the at least one coordinate of the first set of coordinates on the circumscribed square so as to be able to send to the console the second set of Cartesian coordinates which is an image of the first set of coordinates.

The process according to the execution hereinabove comprises a step which defines a circumscribed square to the circle of positions (that is, a square which encloses the circle of positions, and whereof the sides are each tangential to the circle of positions), offering the possibility of executing projection onto one of the sides of the circumscribed square of the projected position in the base plane. This second projection moves from a projected position which is on the circle of positions to a second projected position (defined by the projection of at least one of the coordinates of the projected position) which for its part is on the circumscribed square. This easily defines Cartesian coordinates, and even if the control lever is at a mechanical stop on a mechanical stop of circular, hexagonal or polygonal shape, any shape or even elliptical, coordinates are naturally obtained which are on the circumscribed square to the largest circle of possible positions (as the control lever is at a mechanical stop). For those positions of the lever where the projection belongs to the circle of positions and to the circumscribed square, the transformation does not change the coordinates, but for all the other positions the method amounts to extending the norm of the position vector (with the projection on the circumscribed square), to obtain coordinates on a square.

As a consequence, the projection on the circumscribed square defines a second position point (having as coordinates the second set of coordinates) which constructs a second vector between the origin (the rest position) and the second point whereof the norm is greater than or equal to the norm of a first vector constructed between the origin and the projected position in the base plane. The norms will be equal only if the control lever is shifted in a cardinal direction, and anywhere else, the norm of the second vector will be greater than the norm of the first vector.

It should be noted that when the control lever is shifted according to a cardinal axis (that is, only vertically or horizontally, or again only in abscissa or only in ordinate), there is no modification of coordinates since the circle of positions is tangential to the circumscribed square. As a consequence, when the control lever is shifted anywhere else than according to a cardinal axis or on a point where the projected position belongs to the circle of positions and to the circumscribed square, the projection on the circumscribed square amounts to increasing or extending one of the measured coordinates to define the second set of Cartesian coordinates.

Also, the lever can be mounted as a ball-and-socket linkage relative to the games controller, that is, it is mobile according to two rotations but not in translation or according to a third rotation (generally around the lever). However, the process applies also to a lever which is mobile according to two translations in a plane, and which is blocked according to the three rotations and a translation. As indicated, it is enough for the lever to be mobile according to two degrees of freedom for the method forming the subject matter of the invention to be applied.

Also, the projection in the base plane is advantageously an orthogonal projection relative to the base plane, but an oblique projection is possible, that is, the direction of projection is not perpendicular to the base plane, but inclined (at least by a few degrees for example) relative to the base plane. In other terms, the base plane can be perpendicular to the lever when the latter is in the rest position, but this is not necessary for carrying out the method forming the subject matter of the invention. However, good resolution (definition) needs to be conserved, so that the direction of projection will not be inclined by more than 20° for example relative to the base plane. This amounts to carrying out projection in a base plane which is not perpendicular to the control lever in its rest position.

Advantageously, the projection step of the at least one coordinate of the first set of coordinates on the circumscribed square comprises a step of determining a projected position point as being a point of intersection of an axis bearing a radius of the circle of positions, passing through the projected position, with the circumscribed square. In other terms, the projected position is projected again according to the direction of the radius which defines one of the coordinates of a system of polar or cylindrical coordinates (the distance from the origin).

According to a preferred embodiment, the projection step of the at least one coordinate of the first set of coordinates on the circumscribed square comprises a step comprising of projecting onto the circumscribed square the projected position, according to a direction of projection defined by a radius of the circle of positions, passing through the projected position.

Advantageously, the calculation step of the second set of Cartesian coordinates comprises:
  a step comprising of calculating a first length as being a length of a segment connecting the center of the circle of positions to the projected position,
  a step center of calculating a second length as being a length of a segment connecting the centre of the circle of positions to the projected position point (located on the circumscribed square),
  a step comprising of multiplying each coordinates of the first set of coordinate by a factor defined by a ratio of the second length on the first length. The first set of coordinates is according to the Cartesian system, and the final step of this execution amounts to carrying out homothety on each coordinate of the first set of coordinates. The homothety ratio is greater than or equal to 1, and is equal to the ratio of the distance from the origin of the projected position point (belonging to the circumscribed square) on the distance from the origin of the projected position (belonging to the circle of positions). The homothety ratio is equal to 1 only when the control lever is shifted according to a cardinal direction or in a position where the projected position belongs simultaneously to the circle of positions and to the circumscribed square. In all other cases, it is greater than 1. In the case of a circular mechanical stop the ratio is maximal when the control lever is on a diagonal, it is equal to the square root of around 2 (around 1.414).

According to a first alternative, the projection step of the at least one coordinate of the first set of coordinates on the circumscribed square comprises at least one step comprising of projecting on the circumscribed square the projected position, according to a direction of projection defined by an axis of an orthonormal coordinate system.

According to a particular case of the first alternative, the projection step of the at least one coordinate of the first set of coordinates on the circumscribed square comprises:
  a single step comprising of projecting onto the circumscribed square the projected position, according to a first direction of projection defined by an axis of an orthonormal coordinate system defining the shortest distance between the projected position and the circumscribed square, to define a single projection point. This method avoids calculating conversion coefficients, quickly sending the second set of coordinates.

Advantageously, the second set of Cartesian coordinates is defined by the Cartesian coordinates of the single projection point.

As a second alternative, embodiments of the invention relate to a control method of a position and/or travel of a display element generated on a display screen by a video games console coupled to a games controller comprising a control lever arranged to be shifted by a user according to at least two degrees of freedom in a predetermined zone, the process comprising the steps of:
  measuring a position of the control lever in the predetermined zone with at least one sensor outputting at least one electric signal per degree of freedom,
  projecting in a base plane the position of the control lever measured with the at least one sensor, to determine a first set of coordinates,
  determining an angular sector comprising the projected position of the control lever, from a plurality of angular sectors predefined of the base plane, each angular sector comprising at least one reference point through which passes a circle of reference centered on a rest position of the control lever,
  determining a circumscribed reference square on the circle of reference of the determined angular sector (comprising the projected position),
  determining at least one multiplying factor defined as a function of the determined angular sector on the basis of a projection of the reference point on the circumscribed reference square,
  calculating a second set of coordinates by multiplying each coordinate of the first set of coordinates with the at least one multiplying factor, so as to be able to send to the console the second set of Cartesian coordinates which is an image of the first set of coordinates. The process according to this execution always uses projection of a circle of reference towards a circumscribed square, but determines a multiplying factor valid for a set of points combined in the same angular sector. In other terms, conversion is done per batch of points. But in the same way as for the first aspect, projection of a reference point forming part of a circle is passed through to define a second projected point forming part of a circumscribed square to the circle.

Here too, the process defines a second position point (having the second set of coordinates as coordinates) which builds a second vector between the origin (the rest position) and the second position point whereof the norm is larger than or equal to the norm of a first vector constructed between the origin and the projected position in the base plane. The norms will be equal only if the control lever is shifted in a cardinal direction or in a position where the projected position belongs simultaneously to the circle of positions and to the circumscribed square, and anywhere else, the norm of the second vector will be larger than the norm of the first vector.

Advantageously, each angular sector of the plurality of predefined angular sectors is defined by the intersection of two straight lines passing through the rest position with two circles centered on the rest position, so as to cut out and cover the entire surface of the possible projections of the position of the control lever in the base plane. In other terms, each angular sector is a portion of a crown or a quarter disc. It is possible to further segment the partition or segmentation in the zones away from the rest position to retain the same calculation precision.

Advantageously, the steps comprising of determining the circle of positions, determining the circumscribed square on the circle of positions, projecting onto the circumscribed square the at least one coordinate, and calculating the second set of coordinates in a Cartesian frame of reference (according to the preferred execution, the first alternative or the second alternative) are conducted previously for all the possible projected positions of the control lever in the base plane so as to define a predefined conversion table of the first set of coordinates towards the second set of coordinates. Otherwise expressed, the steps linked to the projection are conducted prior to use of the games controller to create a predefined conversion table which is stored in computer storage means of the games controller. As a consequence, calculations are limited during use of the games controller.

Advantageously, the predefined conversion table inputs the first set of coordinates, and outputs a coefficient for multiplying with each coordinate of the first set of coordinates, to calculate the second set of coordinates. The calculations are limited to multiplying the first set of coordinates with the coefficient.

Advantageously, the predefined conversion table inputs the first set of coordinates, and outputs the second set of coordinates In other words, the steps comprising of determining the circle of positions, determining the circumscribed square to the circle of positions, projecting onto the circumscribed square the at least one coordinate, and calculating the second set of coordinates in a Cartesian frame of reference are conducted using a predefined conversion table, the predefined conversion table inputting the first set of coordinates, and outputting a coefficient for multiplying with each coordinate of the first set of coordinates to calculate the second set of coordinates.

Advantageously, the control method comprises a step comprising of sending the second set of Cartesian coordinates to the games console.

Advantageously, the position and/or the travel of the display element generated on the display screen is modified on the basis of the second set of Cartesian coordinates.

Advantageously, the steps as far as the calculation step of the second set of coordinates are conducted with a first resolution, and a step comprising of reducing the resolution prior to the step for sending the second set of coordinates is provided, for sending the second set of coordinates according to a second resolution, less or lower than the first resolution. This execution retains good precision during calculations, and sends the second set of coordinates according to a format which does not need much calculation time for the games console or transmission time between the controller and the console.

Other characteristics and advantages of embodiments the present invention will emerge more clearly from the following detailed description of three embodiments of the invention given by way of non-limiting examples and illustrated by the appended drawings:

DETAILED DESCRIPTION OF THE DRAWINGS

Figure 1:
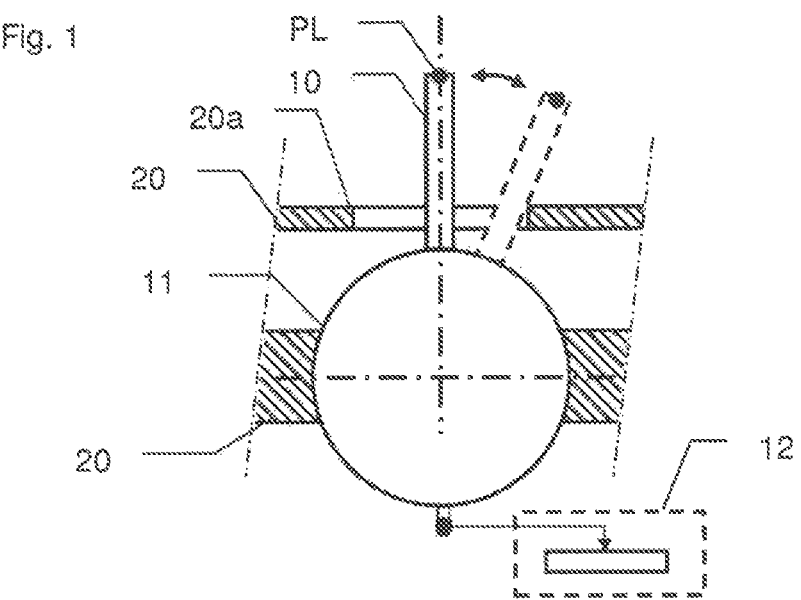
FIG. 1 illustrates a sectional view of a control lever of a games controller video for controlling a position and/or travel of a display element generated on a display screen by a video games console coupled to the games controller, by the process according to an embodiment of the invention.

FIG. 1 illustrates a control lever 10 of a games controller. Such a control lever 10 can be also called "joystick" or "stick". Typically, such a control lever 10 is arranged on an upper surface of a games controller so that it can be actuated and shifted by a user of a video games console, for example to cause movement of a figure, travel of a targeting sight, or even movement of a virtual camera of a video game.

In general, the control lever 10 is therefore mobile relative to a casing 20 of the games controller video, and can be articulated relative to the casing 20 according to a ball-and-socket linkage as shown in FIG. 1. Other links between the control lever 10 and the casing 20 are possible, as for example a linkage allowing just a single flat movement of the control lever 10.

However, the control lever 10 can be shifted in a predefined travel zone only, and limited by a circular stop 20a. In the case shown, the stop 20a is a ridge of the casing 20, forming a hole through which the control lever 10 passes via the casing 20. The following description is therefore linked to a circular shape of the mechanical stop, and other stop shapes are possible and will be mentioned after the description of this particular embodiment. To detect the movements of the control lever 10, the latter is connected to at least one position sensor 12, such as a potentiometer. Such a position sensor 12 detects the movements of the control lever 10, and therefore calculates a position of a point PL of the control lever 10, for example.

In the present case, the control lever 10 can be shifted here according to two degrees of freedom, so that two position sensors can of course be provided, or a single position sensor with two measuring tracks to measure precisely all the positions which the control lever 10 can occupy.

The stop 20a is a circle (of course, as mentioned hereinabove, other stop geometries are possible: polygon, octagon hexagon, ellipse), and if the positions of the point PL are projected into a base plane, perpendicular to the control lever when the latter is in the rest position (as shown in FIG. 1 in solid lines), the projected positions are all contained in a stop circle Cm shown in FIG. 2 or 3. The base plane can be inclined by a few degrees from a plane perpendicular to the control lever when the latter is in the rest position, and the projection of the mechanical stop circular will be an ellipse in this inclined plan.

Figure 2:
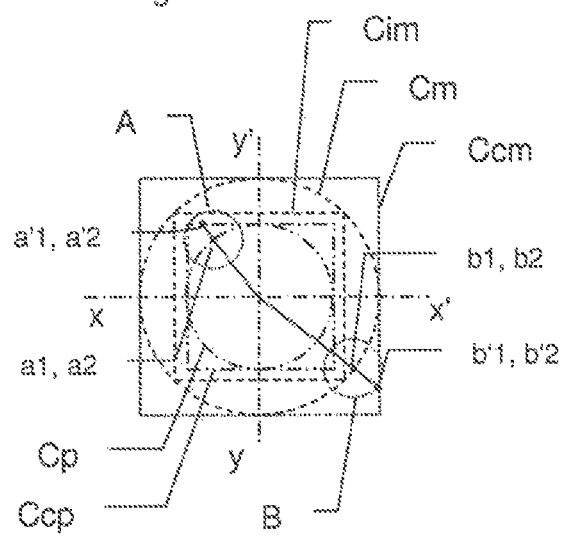
FIG. 2 illustrates a first execution of the processing of the measured position of the control lever of FIG. 1 performed by the process according to the invention.
Figure 3:
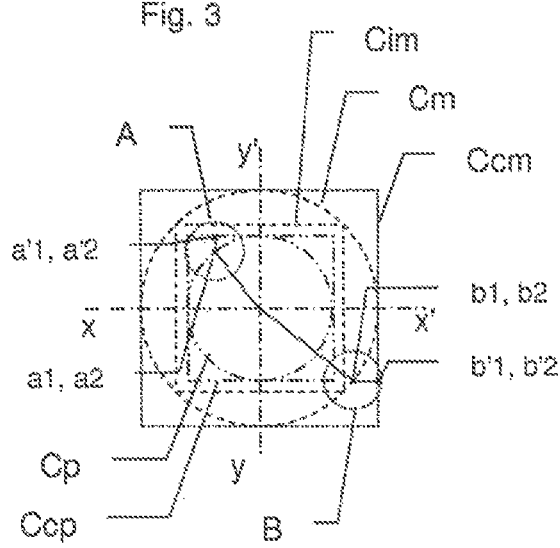
FIG. 3 illustrates a second execution of the processing of the measured position of the control lever of FIG. 1 performed by the process according to an embodiment of the invention.

In fact, FIGS. 2 and 3 show the stop circle Cm, which is the limit of travel of the control lever 10. In conventional terms, it is understood that when the control lever 10 is stopped, the games controller must send information to the games console stating that the intensity of the travel is maximal when the control lever 10 is stopped.

However, the movement of the control lever 10 is limited by a circle, but the games console must receive a position from the control lever 10 in the form of a set of Cartesian coordinates, and the norm of a vector between the origin of the Cartesian frame of reference and the projected position in the base plane must be maximal.

In the Cartesian frame of reference (x-x'; y-y') shown in FIGS. 2 and 3, when the control lever 10 is stopped pointing up, according to a 45° diagonal, the signal sent to the console must be full-scale, therefore the Cartesian coordinates are for example (1, 1). However, if an inscribed square Cim is traced in the circle Cm, and if the control lever 10 is shifted upwards out of the inscribed square Cim, and still in the circle Cm without be stopped, the coordinate according to the axis y'-y would have to be further increased, but this would distort the interpretation made by the console since the norm of the vector between the origin and the projected position in the base plane would be greater than that of the vector when the control lever 10 is stopped on the diagonal.

As a consequence, there would be incoherence of the intensity of the travel restored by the console: intensity 1 when the projected position of the control lever is on the diagonal at 45° and on the circle Cm (control lever 10 stopped at 45°), and greater intensity when the projected position of the control lever is outside of the inscribed square Cim, but not on the circle Cm (control lever 10 not stopped).

To avoid this incoherence, once the projected position of the control lever 10 exits the inscribed square Cim, one of the Cartesian coordinates is imposed on 1, which amounts to ignoring four travel zones which are quarter discs defined by the zones of the stop circle Cm which are out of the inscribed square Cim.

It is understood that during travel of the control lever 10 according to a cardinal direction (the projected position is therefore on one of the axes yy' or xx'), full scale is reached once projected position is on or exceeds the inscribed square Cim.

To rectify this disadvantage, and to consider the entire travel zone of the stop circle Cm, the invention proposes calculating the set of coordinates which will be sent to the games console by creating homothety from the projected position of the control lever in the base plane.

FIG. 2 shows a first execution of this calculation, in two specific cases.

In the first specific case, the control lever is in the position A, and the projected position in the plan basis has as coordinates (a1, a2). Initially, a circle of positions Cp is determined, which passes through the projected position of coordinates (a1, a2), and which is centered on the rest position of the control lever (the origin of the reference frame (xx', yy')).

Next, the process determines a circumscribed square Ccp on the positions circle Cp, and determines the point of intersection of the radius passing through the projected position of coordinates (a1, a2) with the circumscribed square Ccp, which has as coordinates (a'1, a'2).

It is the coordinates (a'1, a'2) which will be sent to the games console. To calculate them, the length of the radius R1 of the circle of positions which passes through the point (a1, a2) is determined by way of the Pythagoras theorem (equation 1). And then the length R2 of the segment which has as its ends the origin of the frame of reference and the point of coordinates (a'1, a'2) is determined by the Thales' theorem (equation 2).

$$R1=\sqrt{(a1^2+a2^2)} \qquad \text{Equation 1}$$

$$R2=(a1^2+a2^2)/a2 \qquad \text{Equation 2}$$

It then remains to multiply each coordinate of the first set of coordinates (a1, a2) by the ratio R2/R1 to find the coordinates of the second set of coordinates (a'1, a'2).

The process therefore performs homothety based on a difference in dimension between the circle of positions Cp and its circumscribed square Ccp. The projected position is artificially "augmented" or "displaced" towards the circumscribed square Ccp to find the second set of coordinates. This is about projection according to the radial direction.

It should be noted that the second set of coordinates is equal to the first set of coordinates when the control lever is shifted only in a cardinal direction (along the axis xx' or yy'): the homothety then has a ratio of 1. Also, the homothety ratio is maximal when the control lever 10 is shifted along a diagonal: the ration is then around 1.414, that is, square root of 2.

As a consequence, the console does receive a second set of Cartesian coordinates, with full scale only when the control lever is stopped, and this without ignoring the measuring zone.

The position B of FIG. 2 correctly shows the control lever 10 stopped, and the coordinates of the projected position are (b1, b2), located on the stop circle Cm. The transformation amounts to calculating the projection of the projected position on the circumscribed square Ccm according to the radial direction which passes through the projected position to calculate the second set of coordinates (b'1, b'2) which will be sent to the console.

The process according to embodiments of the invention can perform the steps for determination of the circle of positions Cp, of the circumscribed square Ccp and projection to each measurement of the position of the control lever 10 to calculate the second set of coordinates with the homothety ratio, or else a predefined table can be built by calculating the homothety ratio for all possible positions, storing this predefined table in the games controller and simply searching for the adequate ratio as a function of a measured position, and multiplying the coordinates measured by the adequate ratio to find the second set of coordinates. As an alternative the second set of coordinates can be stored directly in the predefined table.

FIG. 3 shows a first alternative. In this alternative, determination of the circle of positions Cp and of the circumscribed square Ccp is identical. However, instead pf projecting the projected position according to the radial direction, the process performs a single projection parallel to one of the axes xx' or yy', and in particular towards the side of the circumscribed square which is the closest, to find the second set of Cartesian coordinates to be sent to the games console.

In particular, in the specific case where the control lever 10 is in the position A, the first set of coordinates of the projected position is (a1, a2). The closest side of the circumscribed square Ccp is the upper horizontal side, so that the coordinates of the second set of coordinates will be (a'1, a'2), with:

$$a'1 = a1$$

$$a'2 = \sqrt{(a1^2 + a2^2)}$$

In the event where the control lever 10 is in the position B (stopped), the first set of coordinates of the projected position (onto the circle Cm therefore) is (b1, b2), and the closest side of the circumscribed square Ccm is the vertical right side, therefore the projection of the projected position on the circumscribed square Ccm will have (b'1, b'2) as second set of coordinates with:

$$b'1 = \sqrt{(b1^2 + b2^2)}$$

$$b'2 = b2$$

Figure 4A:
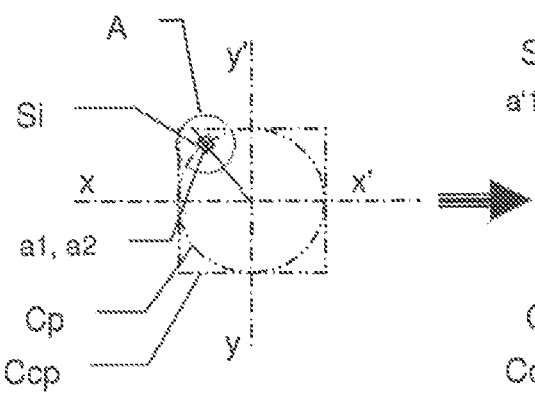
FIGS. 4a and 4b illustrate a third execution of the processing of the measured position of the control lever of FIG. 1 performed by the process according to an embodiment of the invention.
Figure 4B:
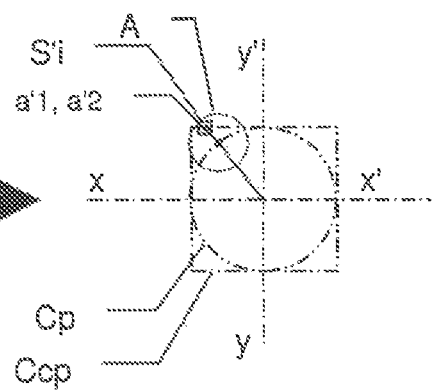

FIGS. 4a and 4b show a third possible execution to determine the second set of Cartesian coordinates to be sent to the games console.

In this execution, the stop circle Cm and its circumscribed square are not shown, so as not to clutter the figures. In fact, the entire surface of the stop circle Cm is cut into angular sectors Si. A single one of these is seen in FIG. 4a, and it is this one which comprises the projected position of the control lever 10 in position A. The angular sector in question Si is a portion of a crown delimited laterally (or angularly) by two straight lines which pass through the center of the frame of reference (the rest position of the control lever 10). The entire surface of the stop circle Cm is cut by angular sectors, making it possible to identify for each projected position of the control lever a particular angular sector which contains it.

For each angular sector it is possible to define a reference point contained in this angular sector, a circle of positions Cp which passes through this reference point and a circumscribed square Ccp to this circle of reference. It is possible to determine the projection of the reference point on the circumscribed square Ccp, according to the radial direction, and determine a multiplying factor as being the ratio of the lengths of the segment connecting the projection of the reference point (on the circumscribed square Ccp) to the origin, and of the radius of the circle of positions. This for each angular sector Si.

As a consequence, for each point forming an element of a particular angular sector Si, it is possible to multiply its coordinates of the first set of coordinates by the multiplying factor particular to this sector, to calculate the second set of coordinates. As FIG. 4b shows, all the points of the angular sector Si are projected with the same multiplying factor towards an angular sector S'i, substantially square.

In other terms, the process carries out processing in batches or by angular sectors to limit the calculations to be performed, by means of a table of multiplying factors which is stored in the games controller, and which gives the value of the multiplying factor to be used as a function of the angular sector Si which contains the projected position.

Of course, if there are two dimensions the multiplying factor comprises two values, one for each dimension.

It will be understood that various modifications and/or improvements obvious to the skilled person can be made to the different embodiments of the invention described in the present description without departing from the scope of the invention defined by the appended claims. In particular, reference is made to a first set of coordinates, and it is not specified which format is used for this first set of coordinates. The invention can function with a first set of cylindrical, spherical, or even Cartesian coordinates.

Figure 5:
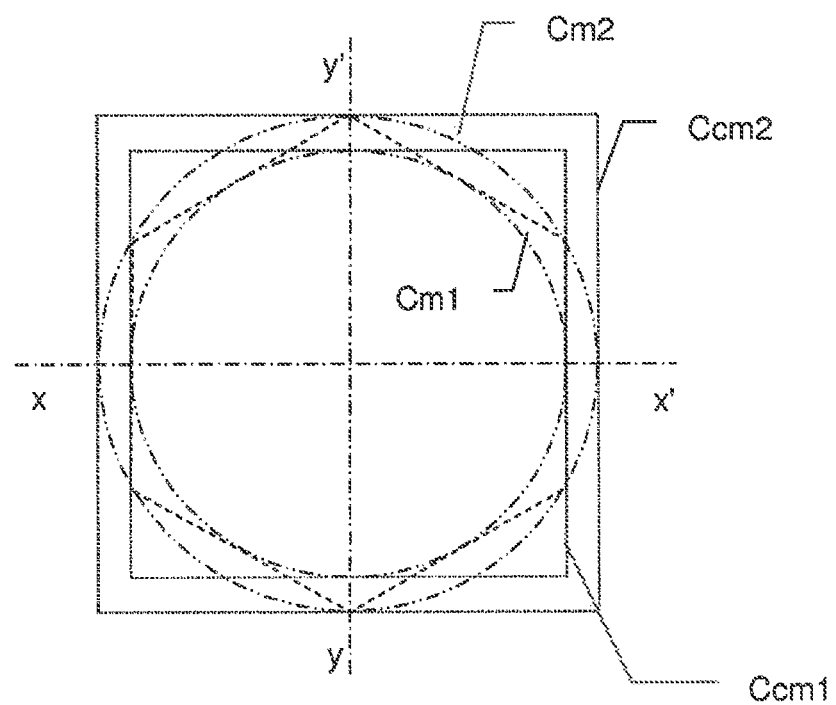
FIG. 5 illustrates the case of a control lever which can be shifted in a zone limited by a mechanical stop of hexagonal shape.

As mentioned hereinabove, the case of a mechanical stop of circular shape has been processed in detail, but the case of a mechanical stop of hexagonal shape can be possible for example, as shown in FIG. 5. The method is identical, with projection of the position of the lever onto a base plane, then determination of a circle of positions which passes through the projected position of the control lever, then projection of the projected position onto a circumscribed square to the circle of positions.

However, when the control lever is in mechanical stop on the casing it can go no further than the hexagonal shape shown in FIG. 5. In the event where the control lever is shifted on the axis xx' only, it is stopped quickly with the casing, and a first circle of positions Cm1 can be determined, as well as a first circumscribed square Ccm1. In the event where the control lever is shifted on the axis yy' only, it can be shifted further before being stopped with the casing (in the region of an apex of the hexagon), and a second circle of positions Cm2 can be determined, and a second circumscribed square Ccm2.

As the second circumscribed square Ccm2 has a size greater than the first circumscribed square Ccm1, there is distortion in the set of second coordinates obtained, which naturally has a greater norm when the lever is stopped mechanically in the region of an apex (second circumscribed square Ccm2) rather than in the middle of a side (first circumscribed square Ccm1). However, this distortion is introduced by the form of the mechanical stop, and not by the method of the present invention.

It can also be seen that the control lever cannot go as far as the apices of the polygonal shape of the mechanical stop (as the control lever has a diameter which will be stopped on the two sides forming the apex by intersection), which amounts only to "rounding" the apices of the hexagon shown to obtain the possible positions of the stopped control lever. The method with projection onto the base plane, determination of the circle of positions, of the circumscribed square and projections stays the same.

The invention claimed is:

1. A control method of a position and/or travel of a display element generated on a display screen by a video games console coupled to a games controller comprising a control lever arranged to be shifted by a user according to at least two degrees of freedom in a predetermined zone defined by a mechanical stop, the process comprising the steps of:
    measuring a position of the control lever in the predetermined zone with at least one sensor outputting at least one electric signal per degree of freedom;
    projecting in a base plane the position of the control lever measured with said at least one sensor, to determine a first set of coordinates U;
    determining a circle of positions (Cp), centered on a rest position of the control lever and passing through the projected position of the control lever in the base plane;
    determining a circumscribed square (Ccp) on the circle of positions (Cp;
    projecting onto the circumscribed square (Ccp) at least one coordinate of the first set of coordinates;

calculating a second set of coordinates in a Cartesian frame of reference, on the basis of the projection of said at least one coordinate of the first set of coordinates on the circumscribed square (Ccp) so as to be able to send to the console the second set of Cartesian coordinates which is an image of the first set of coordinates; and sending the second set of Cartesian coordinates to the games console, wherein the steps as far as the calculation step of the second set of coordinates are conducted with a first resolution, and wherein a step of reducing the resolution prior to the step for sending the second set of coordinates is provided, for sending the second set of coordinates according to a second resolution, less than the first resolution.

2. The control method according to claim 1, wherein the projection step of said at least one coordinate of the first set of coordinates on the circumscribed square (Ccp) comprises a step of determining a projected position point as being a point of intersection of an axis bearing a radius of the circle of positions (Cp), passing through the projected position, with the circumscribed square (Ccp).

3. The control method according to claim 2, wherein the calculation step of the second set of Cartesian coordinates comprises:
a step of calculating a first length as being a length of a segment connecting the center of the circle of positions (Cp) to the projected position,
a step of calculating a second length as being a length of a segment connecting the center of the circle of positions (Cp) to the projected position point,
a step of multiplying each coordinate of the first set of coordinate by a factor defined by a ratio of the second length on the first length.

4. The control method according to claim 1, wherein the projection step of said at least one coordinate of the first set of coordinates on the circumscribed square (Ccp) comprises a step of projecting onto the circumscribed square (Ccp) the projected position, according to a direction of projection defined by a radius of the circle of positions (Cp), passing through the projected position.

5. The control method according to claim 1, wherein the steps of determining the circle of positions (Cp), determining the circumscribed square (Ccp) on the circle of positions (Cp), projecting onto the circumscribed square (Ccp) said at least one coordinate, and calculating the second set of coordinates in a Cartesian frame of reference are conducted previously for all the possible projected positions of the control lever in the base plane so as to define a predefined conversion table of the first set of coordinates to the second set of coordinates.

6. The control method according to claim 5, wherein said predefined conversion table inputs the first set of coordinates, and outputs a coefficient for multiplying with each coordinate of the first set of coordinates, to calculate the second set of coordinates.

7. The control method according to claim 5, wherein said predefined conversion table inputs the first set of coordinates, and outputs the second set of coordinates.

8. The control method according to claim 1, wherein the position and/or the travel of the display element generated on the display screen is modified on the basis of the second set of Cartesian coordinates.

9. A control method of a position and/or travel of a display element generated on a display screen by a video games console coupled to a games controller comprising a control lever arranged to be shifted by a user according to at least two degrees of freedom in a predetermined zone defined by a mechanical stop, the process comprising the steps of:
measuring a position of the control lever in the predetermined zone with at least one sensor outputting at least one electric signal per degree of freedom;
projecting in a base plane the position of the control lever measured with said at least one sensor, to determine a first set of coordinates U;
determining a circle of positions (Cp), centered on a rest position of the control lever and passing through the projected position of the control lever in the base plane;
determining a circumscribed square (Ccp) on the circle of positions (Cp;
projecting onto the circumscribed square (Ccp) at least one coordinate of the first set of coordinates;
calculating a second set of coordinates in a Cartesian frame of reference, on the basis of the projection of said at least one coordinate of the first set of coordinates on the circumscribed square (Ccp) so as to be able to send to the console the second set of Cartesian coordinates which is an image of the first set of coordinates; and,
wherein the projection step of said at least one coordinate of the first set of coordinates on the circumscribed square (Ccp) comprises at least one step of projecting on the circumscribed square (Ccp) the projected position, according to a direction of projection defined by an axis of an orthonormal coordinate system.

10. A control method of a position and/or travel of a display element generated on a display screen by a video games console coupled to a games controller comprising a control lever arranged to be shifted by a user according to at least two degrees of freedom in a predetermined zone defined by a mechanical stop, the process comprising the steps of:
measuring a position of the control lever in the predetermined zone with at least one sensor outputting at least one electric signal per degree of freedom;
projecting in a base plane the position of the control lever measured with said at least one sensor, to determine a first set of coordinates U;
determining a circle of positions (Cp), centered on a rest position of the control lever and passing through the projected position of the control lever in the base plane;
determining a circumscribed square (Ccp) on the circle of positions (Cp;
projecting onto the circumscribed square (Ccp) at least one coordinate of the first set of coordinates;
calculating a second set of coordinates in a Cartesian frame of reference, on the basis of the projection of said at least one coordinate of the first set of coordinates on the circumscribed square (Ccp) so as to be able to send to the console the second set of Cartesian coordinates which is an image of the first set of coordinates; and,
wherein the projection step of said at least one coordinate of the first set of coordinates on the circumscribed square (Ccp) comprises:
a single step of projecting onto the circumscribed square (Ccp) the projected position, according to a first direction of projection defined by an axis of an orthonormal coordinate system defining the shortest distance between the projected position and the circumscribed square (Ccp), to define a single projection point.

11. The control method according to claim 10, wherein the second set of Cartesian coordinates is defined by the Cartesian coordinates of the single projection point.

12. A control method of a position and/or travel of a display element generated on a display screen by a video games console coupled to a games controller comprising a control lever arranged to be shifted by a user according to at least two degrees of freedom in a predetermined zone defined by a mechanical stop, the process comprising the steps of:
  measuring a position of the control lever in the predetermined zone with at least one sensor outputting at least one electric signal per degree of freedom;
  projecting in a base plane the position of the control lever measured with said at least one sensor, to determine a first set of coordinates;
  determining an angular sector comprising the projected position of the control lever, from a plurality of angular sectors predefined of the base plane, each angular sector comprising at least one reference point through which passes a circle of reference centered on a rest position of the control lever;
  determining a circumscribed reference square on the circle of reference;
  determining at least one multiplying factor defined as a function of the determined angular sector on the basis of a projection of the reference point on the circumscribed reference square;
  calculating a second set of coordinates by multiplying each coordinate of the first set of coordinates with said at least one multiplying factor, so as to be able to send to the console the second set of Cartesian coordinates which is an image of the first set of coordinates; and
  sending the second set of Cartesian coordinates to the games console,
  wherein the steps as far as the calculation step of the second set of coordinates are conducted with a first resolution, and wherein a step of reducing the resolution prior to the step for sending the second set of coordinates is provided, for sending the second set of coordinates according to a second resolution, less than the first resolution.

13. The control method according to claim 12, wherein each angular sector of the plurality of predefined angular sectors is defined by the intersection of two straight lines passing through the rest position with two circles centered on the rest position, so as to cut out and cover the entire surface of the possible projections of the position of the control lever in the base plane.

* * * * *